United States Patent [19]
Wise

[11] 3,918,539
[45] Nov. 11, 1975

[54] WEIGHING SYSTEM
[75] Inventor: Cecil S. Wise, Gastonia, N.C.
[73] Assignee: Fiber Controls Corporation, Gastonia, N.C.
[22] Filed: June 11, 1974
[21] Appl. No.: 478,243

Related U.S. Application Data
[60] Continuation of Ser. No. 295,690, Oct. 6, 1972, abandoned, which is a division of Ser. No. 868,758, Oct. 23, 1969, abandoned.

[52] U.S. Cl. .................... 177/210; 177/70; 177/80; 177/120
[51] Int. Cl.² .......................................... G01G 3/14
[58] Field of Search ..... 177/1, 16, 70, 80, 116–123, 177/210, 211; 73/141 R, 14 A, 14 AB

[56] References Cited
UNITED STATES PATENTS

| | | | |
|---|---|---|---|
| 2,767,975 | 10/1956 | Horst | 177/210 |
| 3,071,202 | 1/1963 | Litton et al. | 177/80 |
| 3,073,402 | 1/1963 | Greene et al. | 177/80 |
| 3,225,848 | 12/1965 | Wise et al. | 177/80 |

FOREIGN PATENTS OR APPLICATIONS

| | | | |
|---|---|---|---|
| 1,397,285 | 2/1964 | France | 177/16 |

*Primary Examiner*—Joseph W. Hartary
*Assistant Examiner*—Vit W. Miska
*Attorney, Agent, or Firm*—Cushman, Darby & Cushman

[57] ABSTRACT

A weighing system whereby the weight of material fed into a weigh pan is detected and an electrical signal continually indicating that weight produced and used to control the feeding and dumping of material into and from the weigh pan. In one embodiment, the signal is produced by applying voltage to a wire which supports the weigh pan directly and which has a resistance which varies with the weight supported. In another embodiment, a probe detects the movement of a member attached to the weigh pan, which moves in response to changes of weight in the pan, from voltages generated in the probe by two single turn coils mounted with opposite flux paths on the member for movement with it. The signals produced are used to control the rate of feeding of the material into the weigh pan and to cut off feeding when a chosen weight is indicated. Control circuitry for weighing and dumping material in a fiber blending system is also disclosed.

22 Claims, 8 Drawing Figures

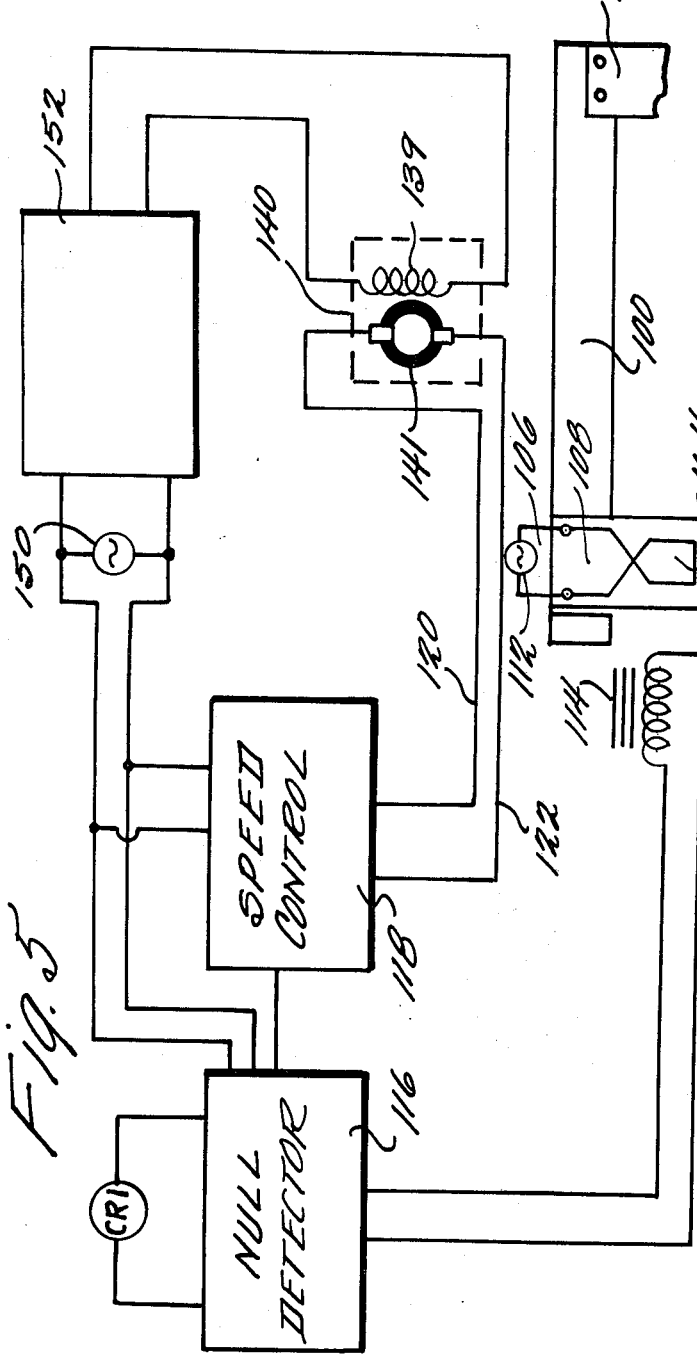
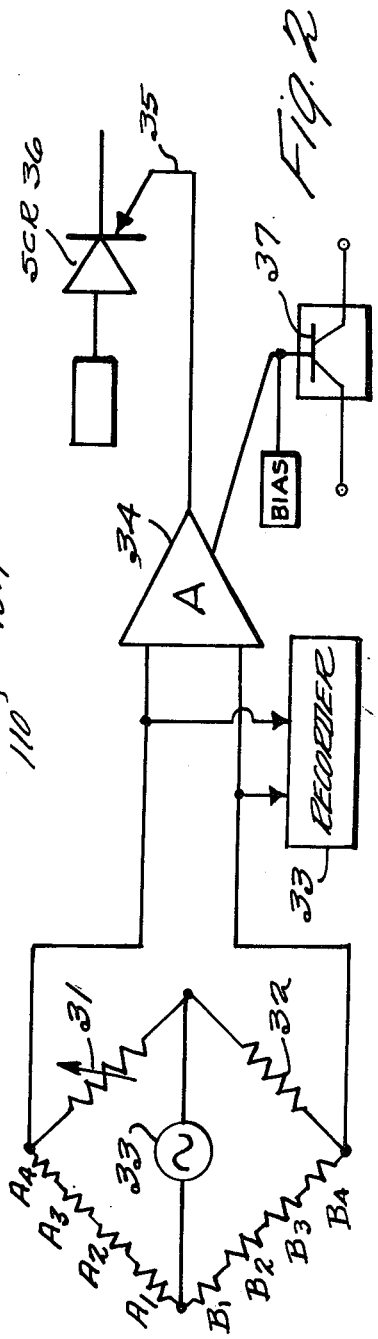

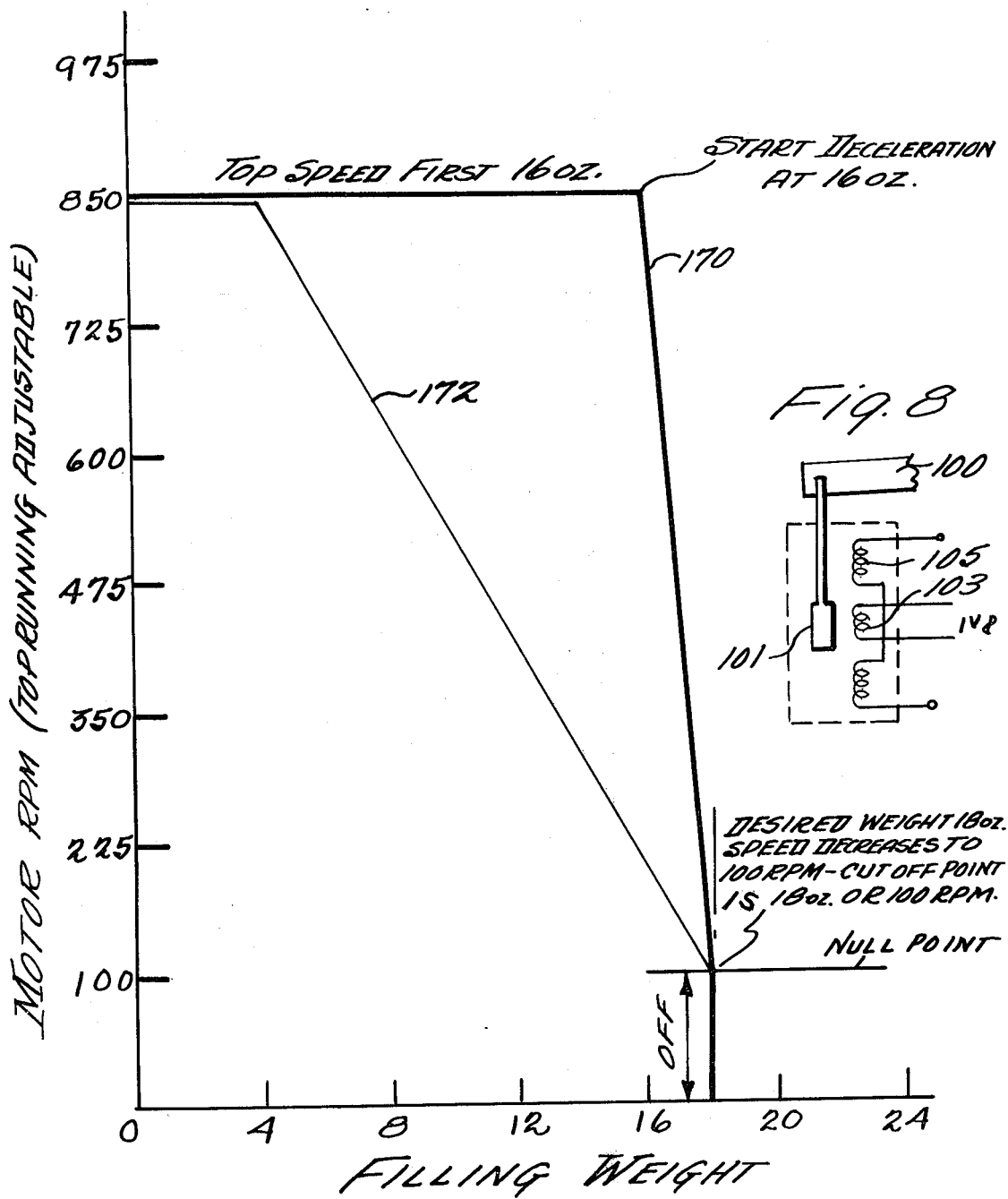

WEIGHING SYSTEM

This application is a continuation of my copending application Ser. No. 295,690 filed Oct. 6, 1972, now abandoned, which was a copending divisional application of my grandparent application Ser. No. 868,758 filed Oct. 23, 1969 and now abandoned.

DESCRIPTION OF THE PRIOR ART AND SUMMARY OF THE INVENTION

The invention relates to a weighing system whereby an electrical signal is produced which indicates the weight of the mass being weighed by a sensing arrangement such as a unitary element which directly supports the mass to be weighed and acts as a strain gauge or such as a probe which detects the movement of an arm attached to a weigh pan which moves in response to changes of weight in the pan.

A variety of devices for measuring weight have found great acceptance and utility in the past. For example, strain gauges have been used in weighing systems for many years, and in many of these systems, resistance changing wire, which has a resistance proportional to the force stretching the wire, has formed the gauge. The U.S. Pat. to Laycock, No. 2,920,880 of Jan. 12, 1960, discloses a typical system wherein four wires having a resistance displaying this characteristic, are wound around a partially hollowed post, two around the hollowed portion and two around the solid portion. These wires are connected in an electrical bridge such as a Wheatstone bridge so that, when a load is applied, the hollow portions distort more than the solid portions and hence increase the force stretching the wires around the hollow section more then the force stretching the wires around the solid section, resulting in a voltage change at the bridge output.

In one embodiment of the present invention a unitary element which directly supports the weight to be determined acts as a strain gauge and has some property, such as electrical resistance, which measurably varies with changes in the weight supported. This arrangement is especially effective in a weighing system since changes in weight are a function of changes in the force stretching the wires, thereby maximizing the resistance change of the wires and the accuracy of the system. The electrical signals produced very accurately reflect the weight and moreover give a continuous indication of that weight. In addition, the inherent simplicity of this arrangement makes this system particularly economical and useful.

In another embodiment of the invention, the weight of material in a weighing pan is determined by detecting the minute movements of an arm or other member attached to the weighing pan which moves as the weight in the pan changes. This detection may be accomplished, for example, by electrically exciting two opposed, single turn wires formed from a single wire and mounted on the arm for movement with the arm. A probe mounted stationary with respect to the coils responds to the excitation of the coils by producing an electrical signal which varies with the relative positions of the coils and probe so that the electrical signal indicates continuously the weight in the pan and can be used to control the feeding and discharge of the pan.

The weighing system of the present invention finds special utility in use with apparatus for blending fibers, especially textile fibers, by weight. Modern fabrics are frequently made from yarn or thread which is a blend of different types or bales of fibers, for example natural fibers, such as wool and cotton, and synthetic fibers such as nylon, rayon, etc. It is highly desirable to prepare a completely homogenized blend of the different fibers making up any one particular type of yarn or thread in order to achieve complete uniformity and avoid imperfections in fabrics made therefrom. The U.S. Pat. No. to Lytton et al, Re. 25,609 of Jan. 1, 1963, describes one such blending system wherein fibers are dumped from a number of feeders onto a movable conveyor system. The U.S. Pat. to Wise et al., No. 3,225,848 of Dec. 28, 1965 discloses a control system suitable for operating such a blending system, and the detailed operation of these systems is included below.

The weighing system of the present invention, when used in combination with a fiber blending system, can produce a continuous electrical signal, which is a continuous function of the weight of material in any weighing pan. Although, in the embodiments discussed herein, this electrical signal is produced by two sets of resistance changing wires arranged in adjacent legs of a bridge circuit and by a null detector receiving signals from a probe mounted adjacent to the two opposed coils, such an electrical signal can be produced in a variety of other ways, and regardless of its origin, used to record and control the entire weighing and blending cycle.

This electrical signal indicating weight can, for instance, be applied to a strip chart or other recorder on or near each weighing mechanism to provide a continuous, visual record of the operation of that weighing mechanism, so that malfunctions can be quickly observed and the time of the malfunction noted. Further, an alarm can be included which will visually, audibly, or both, indicate that the weighing mechanism is not operating properly. It may prove desirable to record only the weight at the time of some occurrence, such as a weigh pan dump, or the operation can be continuously recorded. Also, all of the electric signals from all of the weigh pans which dump onto a particular conveyor or from all of the pans which dump onto all conveyors can be transmitted to a remote location where the operations can be easily and centrally monitored. In addition, it is possible to compare the signals from a number of weighing systems which have been conveyed to a central point with the normal signals expected, for example in a computer, and to then automatically or manually initiate whatever action is required to deal with discrepancies.

The weight indicating electrical signal can be further utilized to control the rate at which the different types or grades of fibers are fed into each of a number of weigh pans, since the weight in the pan can be continually determined as material is being fed into the weigh pans. When the weigh pans are empty, it is, of course, desirable to feed the material into the pans as rapidly as possible. However, if the pans are still receiving material at this rapid rate when the correct weight has been accumulated within the pans, it is difficult to cut off the feeders precisely. Since the electrical signals reflect the weight in the pans at all times, these signals can be used to control the feeders so that the feeding begins at a rapid rate and is gradually decreased as the weight of material in the pan approaches the desired limit. This results both in greater speed in filling the pan as well as greater accuracy in weighing.

BRIEF DESCRIPTION OF THE DRAWINGS

Further advantages and details of the invention will become more apparent to those of ordinary skill in the art upon reading the following detailed disclosure of the invention in conjunction with the drawings, in which:

FIG. 2 shows a bridge circuit for determining changes in the weight supported;

FIG. 5 shows another embodiment of the invention whereby the movement of an arm attached to a weigh pan indicates weight;

FIG. 6 shows a graphical representation of the speed of the feed motor during filling of a weigh pan;

FIG. 8 shows a modification of the arrangement in FIG. 5 whereby the movement of an arm attached to a weigh pan is detected to produce an electrical signal indicating weight.

DETAILED DESCRIPTION OF THE DRAWINGS

Figure 1:
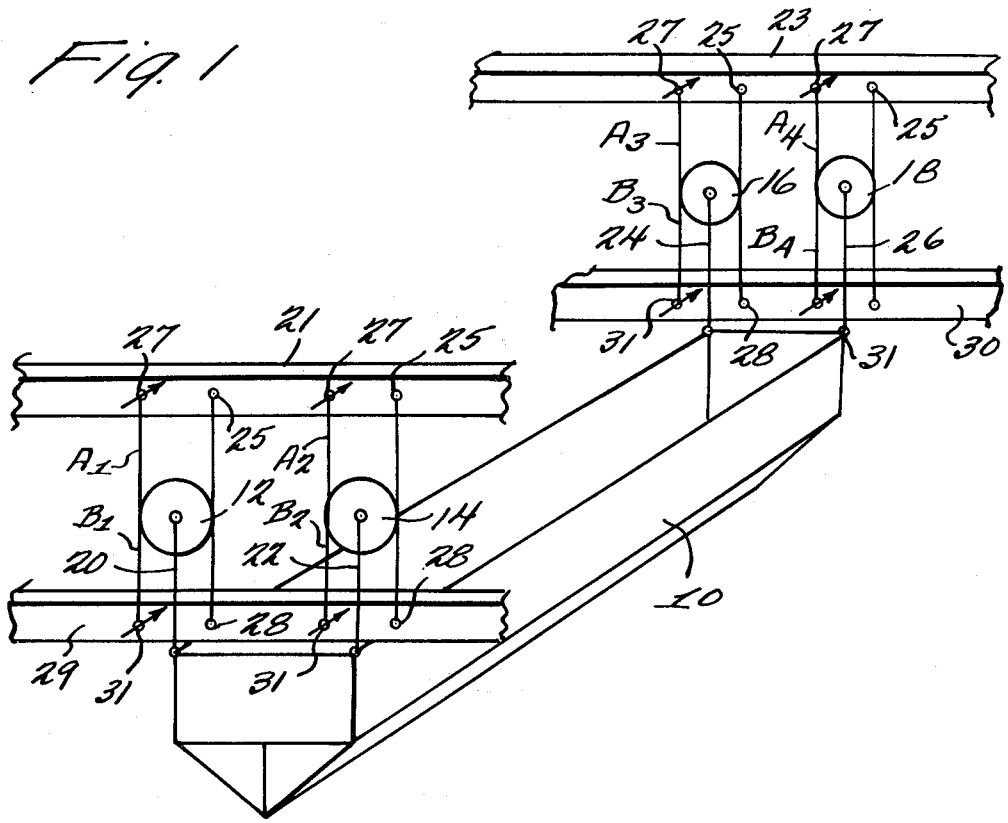
FIG. 1 shows an embodiment of the invention wherein a weigh pan is supported by resistance changing wires.

Reference is now made to FIG. 1 which discloses one embodiment of the invention whereby the material to be weighed is deposited into a weigh hopper or pan 10. The pan 10 is shown suspended from four block pulleys 12, 14, 16 and 18 respectively by wires 20, 22, 24 and 26, which are anchored in any convenient manner, respectively, at the upper four corners of the pan. In this embodiment, these wires 20, 22, 24 and 26 do not necessarily have any particular property which varies with the change in weight, but merely serve to suspend the pan 10 from the pulleys.

Each of the four pulleys 12, 14, 16 and 18 is preferably of the two groove type, with the grooves being electrically insulated from each other. For example, the whole of each block may be made or covered with suitable electrically insulating material. In turn, each pulley is suspended from an exemplary fixed support 21 at one end of the pan 10 and support 23 at the other end by respective wires A1, A2, A3 and A4 each of which loops one of the pulleys via one of its grooves.

In this embodiment, each of these wires A1, A2, A3 and A4 has an electrical resistance which is proportional to the force stretching it and hence can act as a strain gauge element. One end 25 of each of the wires A1, A2, A3 and A4 is firmly attached to insulated supports 21 and 23 while the other end 27 of each of these wires is attached to supports 21 and 23 in a manner such that the length of each of the wires can be easily adjusted. This adjustability is diagrammatically depicted in FIG. 1 by arrows drawn through the adjustable end 27 of the wires. The wires A1, A2, A3 and A4 are looped about the insulating pulleys 12, 14, 16 and 18 so that each side of each wire is subjected to a stretching force by the weight of the pan and by the weight of material in the pan.

The set of wires B1, B2, B3 and B4 is similarly looped around the other insulating groove of pulleys 12, 14, 16 and 18. Again, one of the ends 28 of each of these wires is firmly attached to an immovable insulated support 29 or 30, and the other end 31 is adjustably attached to those supports so that the total length of each wire is variable as indicated by the arrows at ends 31. Wires B1, B2, B3 and B4 as disposed on the pulleys are electrically insulted from and opposite wires A1, A2, A3 and A4 respectively. Each of the upper and lower set of wire loops is adjusted to be taut so that preferably an increase in the force stretching the upper set of wires results in a corresponding decrease in the force stretching the lower set.

Instead of one loop as illustrated, each of the A and B wires in FIG. 1 may be longer and looped two or more times around its respective insulating pulley 12, 14, 16 or 18 and for example another insulating pulley (not shown) secured for rotation on the respective fixed support 21 or 23. This allows for greater amplification of weight changes. Also, instead of a loop set at each corner of the pan 10, one loop set at each end may be used and in any case a straight wire may be substituted for a loop set or any loop if desired.

It is useful but not essential if the relation between the changing property (in this embodiment electrical resistance) and the weight supported is one valued, i.e. for each particular weight supported within the weight range of the weighing system there exists one unique value of the property. However, there is no necessity for the relation to be linear as long as the changes in value of the property are sufficient to permit measurement within tolerable limits of accuracy.

One type of wire which shows marked changes in resistance when subjected to changes in the stretching force is "Nichrome" wire, a trademark for a wire alloy of nickel, iron and chromium. Nichrome wire further has properties of strength and resistance stability over a wide range of temperatures, which render it especially useful for this invention, and it does not stretch appreciably while weight is being applied. However, many other materials exist with which the invention could be practiced, and the invention is not limited to the use of Nichrome wire.

Although, in the embodiment detailed, the property is electrical resistance, many other properties of many materials are also suitable. For example, when a piece of magnetic material is subjected to a compressive force, the permeability decreases in the direction of the force and increases at right angles to the force, while under tensile strength the reverse is true. These changes in permeability could be detected to indicate changes in weight supported. Capacitance and optical transparency are two more examples of properties which exhibit this changeable characteristic in varying degrees in many materials.

FIG. 2 shows one possible arrangement of the two sets of wires which can be used to determine the weight resting in the weigh hopper or pan 10 of FIG. 1. Of course, the simplest method of determining the resistance of a wire is simply to apply a potential across the wire and measure the current through the wire. This measurement can be indirectly accomplished more accurately by placing the resistance to be determined in a bridge circuit. A bridge circuit is especially useful in that resistance change such as the total resistance change of two sets of wire changing in opposite directions, can be easily measured and the bridge set to balance or unbalance when certain legs have certain resistances. The use of a bridge results in greater accuracy on the determination of the unknown resistance, as well as permitting manipulation of the other bridge elements to effect balancing of the bridge when the unknown resistance reaches a given value.

The wires A1, A2, A3 and A4 of FIG. 1 are electrically connected in series, and then situated in one leg of an electrical resistance bridge as shown in FIG. 2. Of course the two sets of wires remain physically in place and only connect to the bridge electrically. Likewise, wires B1, B2, B3 and B4 are linked serially and comprise an adjacent leg of the bridge. One of the other legs of the bridge is a variable resistance 31, and the fourth leg is an invariable resistance 32. Although the bridge shown in FIG. 2 is a four resistor bridge commonly known as a Wheatstone bridge, the invention is not limited to a Wheatstone or a resistive bridge. Any bridge which is suitable to detect the resistive changes and hence weight changes may be used.

It is of course not necessary that both sets of wires be utilized in the bridge. Either the wires A1, A2, A3 and A4 or the wires B1, B2, B3 and B4 can be used independently as one leg of the bridge. However, by using two sets of wires, one whose resistance is increasing and one whose resistance is decreasing, in adjacent legs of the bridge, the sensitivity of the system, and hence the accuracy is improved considerably. Furthermore, the use of two sets of wires provides a measure of compensation against thermal changes in resistance.

The bridge is excited by an alternating current or direct current source 33 which is applied in this embodiment between the point linking the two sets of wires and the point between the variable resistance 28 and the resistance 30. Since an increase in the weight of material in the pan 10 changes the resistance of the two sets of wires in opposite direction, increasing the resistance of one set and decreasing the resistance of the other, the total change in output voltage across both sets of wires is a measure of the total change of weight of the material in the pan.

The variable resistance 31 can be a potentiometer which is set manually or set automatically by inserting a printed circuit or punched card into apparatus which interprets the information on the card or circuit and sets the resistance 31. The value of the variable resistance 31 so chosen then determines the weight of material in the pan necessary to provide a given output, for example a balanced bridge. While preferably the bridge balances when the predetermined weight of material chosen by setting the value of the variable resistor 31, is received in the pan 10, the reverse may be true, i.e., the bridge balances at zero weight in the pan and is unbalanced a predetermined extent, as shown by the bridge output voltage, when the pan contains the predetermined weight of material.

The lengths of either or both of the sets of wires can also be adjusted as described in connection with FIG. 1 to change the resistance value of both sets of wires for any given weight. This adjustment can be made to compensate for changes in any of the bridge resistances with time or temperature or to finely calibrate the system after the variable resistance value associated with each weight has been finally chosen. Of course many other bridge circuits and other arrangements may be used to determine changes in wire resistances, and this resistance bridge exemplifies only one.

The output of the bridge can then be directly or indirectly applied to a recorder 33 which monitors and records the weight of material in the pan either continuously or at selected intervals. Only the weight in each pan at the time of dump and the time of dump need be recorded if desired. For example, a strip chart recorder can be located on or near every weighing mechanism to provide a continuous visual record of the operation of every mechanism so that malfunctions can be quickly observed and corrected. In addition, a visual or audio alarm associated with each recorder can be adapted to immediately indicate when each weighing mechanism is deviating from the expected behavior beyond a predetermined accuracy. Furthermore, the recorder can be easily located remotely and can serve to record the operation of a number of pans either simultaneously or sequentially, recording the weight of material in a variety of manners.

The recorder 33 may also be a digital computer which then can correlate the information received from each of the pans. The computer can respond quickly to an inquiry about any given pan and quickly provide any type of information in convenient form. Information can be regularly and conveniently prepared in whatever form desirable. The computer can also make choices regarding distribution of raw materials, output, and other actions in response to the information which it receives.

The amplifier 34, shown in block form, simply amplifies the bridge output voltage and produces an electrical signal which has a greater range and is hence more suitable for controlling the weighing apparatus. In FIG. 2, the output of the amplifier 34 is applied to the gate 35 of an SCR 36 and the base 37 of the transistor 38 which are used to control the weighing system as described below.

Figure 3:
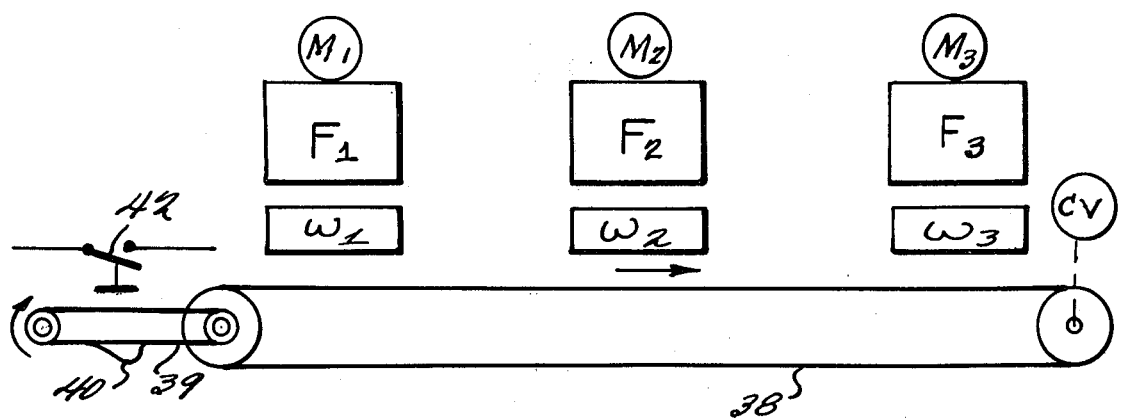
FIG. 3 shows a fiber blending system.

In FIG. 3, a system for weighing and blending a number of different kinds or types of fibers (or even different bales of the same fiber) in exact proportions is shown. A similar blending system is discussed fully in Wise et al., U.S. Pat. No. 3,225,848 of Dec. 28, 1965 and in Lytton U.S. Pat. No. Re. 25,609 of Jan. 1, 1963 and the disclosure of both are incorporated herein by reference.

In the system disclosed in the above mentioned Wise et al. patent, each of the different types of fibers to be blended are fed into a feeder. In FIG. 3, three such feeders F1, F2 and F3 are represented. As described in the Wise et al. patent each feeder, such as F1, F2 and F3 in FIG. 3, elevates the fibers and then discharges the same in a stream which can be cut off from a downwardly facing elevated discharge opening into a weighing mechanism associated with each feeder. In the Wise et al. system, each such mechanism includes a weigh hopper or pan that is substantially rectangular and which is suspended by suitable straps from a yoke-like scale bean which in turn is balanced on knife edge pivots by an adjustable counter-weight on the opposite side of the pivots from the pan.

In the system disclosed in the Wise et al. patent, a permanent magnet holds the pan in an upper position as the fiber collects in the pan and the apparatus is adjusted so that a predetermined weight of material in the pan overcomes the magnet and causes the pan to move downward to a lower position. The bottom of the pan is then normally closed by two hinged doors which are kept barely closed by counterweights operating in a door-closing mechanism. This door-closing mechanism becomes inoperable, allowing all the material to spill out on a moving conveyor only when all the pans operating together such as W1, W2 and W3 in FIG. 3 have moved downward indicating that the correct, but not necessarily the same weight of material, is lodged in each pan, and when such other conditions as required have been fulfilled. The conveyor then carries the fibers to a continuous blender beater which thoroughly mixes and blends the different fibers fed therein.

The present invention contemplates a weighing system which can be used with or in combination with the blending system described in the Wise et al. patent. The invention, however, is not limited to use with blending apparatus and can be used to weigh any material.

The Wise et al. U.S. Pat. No. 3,225,848 of Dec. 28, 1965, discloses a control system for use with a blending system such as disclosed in the above mentioned Lytton et al. patent. A logic network utilizes relays to control the operation and timing of the feeders, the weighing mechanism, the dumping mechanism and the conveyor. The control system in FIG. 4 of the present invention as described below is similar to the system disclosed in Wise et al. except for differences in the weighing mechanism and in the arrangement of the relays.

Figure 4:
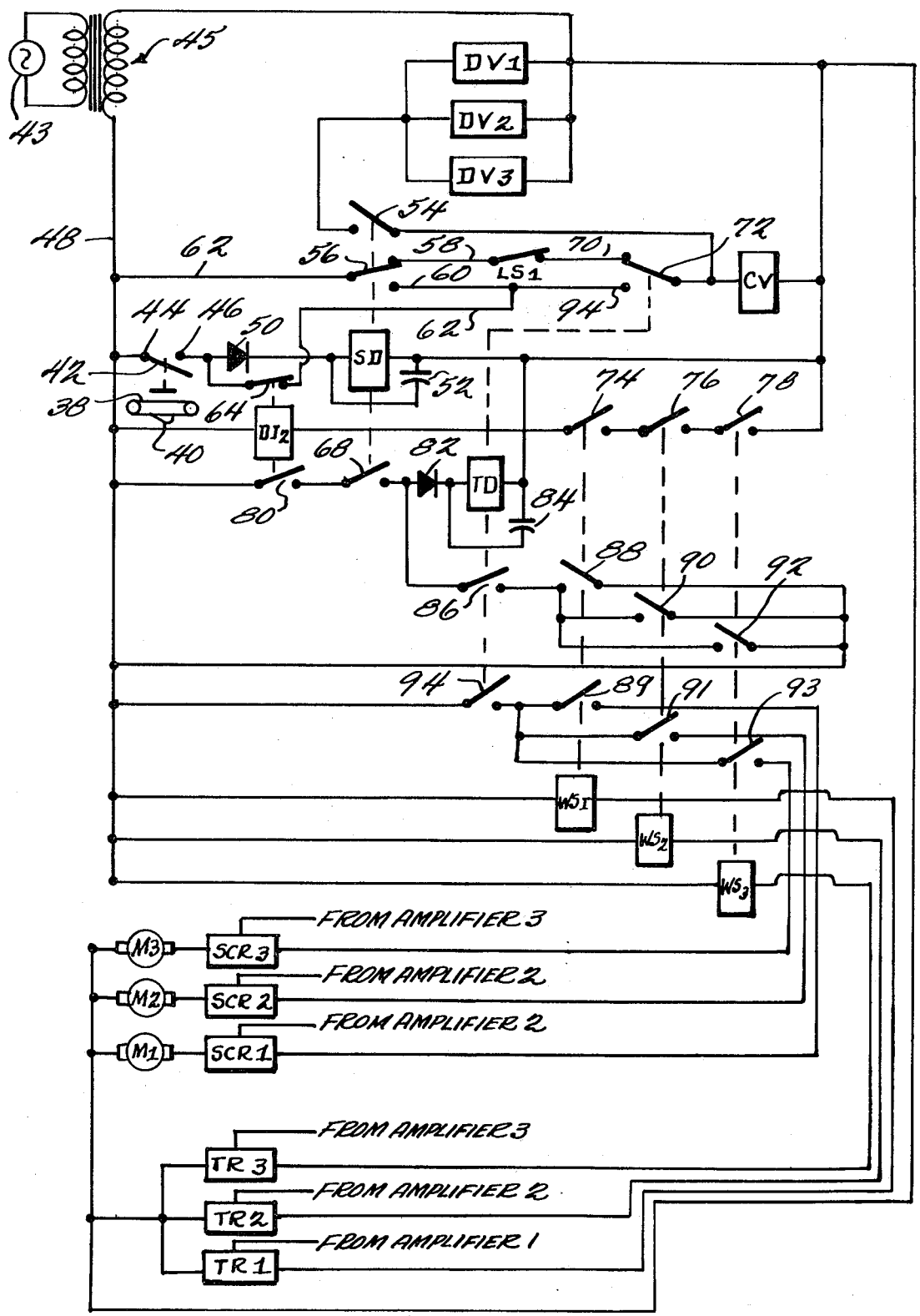
FIG. 4 shows a system for weighing fibers and controlling the operation of a fiber blending system.

Referring to FIG. 4, a control circuit is shown which can be used in connection with a plurality of weigh pans to blend fibers or, indeed, any materials. This circuit is similar both in function and structure to the circuit disclosed in the Wise et al. patent mentioned above, except that the circuit is especially designed for a system wherein weighing is accomplished by means of the weighing system disclosed in FIG. 1 with resistance changing wires. Furthermore, a system such as shown in FIG. 2 wherein a number of resistance changing wires are arranged in a bridge to produce an electrical signal which is then amplified is utilized to control elements such as the SCR 32 and the transistor 34, and, therefore, to control the blending cycle, finds special utility in use with the circuit of FIG. 4.

However, the circuit shown in FIG. 4 is not limited to use with the resistance changing wire system shown in FIG. 1 and can be also employed with any weighing system which produces an electrical signal which changes with the weight supported. For example, a motion modulation circuit might also be employed to produce such an electrical signal. Such a modulation circuit is described in the U.S. Pat. to Banks et al. No. 3,371,419, for determining diameter of objects by moving a core within the coils of a differential transformer to produce an electrical signal which indicates the position of the arm. If the position of the arm is a function of the weight in the pan to which it is attached, then the electrical signal is also a function of that weight.

Similar devices whereby the coupling between two windings of a transformer is varied by moving a core so that when one winding is electrically excited the output of the other winding indicates the position of the core and hence any member attached to the core are described in U.S. Pat. Nos. Antony et al. 3,064,809; Torn et al., 2,987,825; and Reanson, 3,136,069. The patent to Wysocki, 3,005,969 discloses another arrangement whereby the displacement of a mechanical member generates an alternating current signal.

Such systems might be employed with the blending system of the Wise et al. patent wherein the pans are held by permanent magnets, moving downward, when the desired weight of material is in the pan. As shown in FIG. 8 a core 101, which can simply be a ferret iron movable slug is attached to the arm 100 as in FIG. 5. As the pan fills with material, core 101 then moves vertically, altering the coupling between coil 103, which is driven in FIG. 8 by a 1 volt alternating current source, and coil 105. The output of coil 105 thus is an electrical signal which reflects the weight in the pan attached to arm 100. This signal could be then utilized in a circuit, such as shown in FIG. 4, to control the blending operation. Any other system which produces an electric signal which is related to weight can be used with equal effectiveness.

Assuming that the system has just completed a dump of all the weigh pans and that the conveyor is moving, all of the relay switches will be in the positions shown in FIG. 4 and only the relay CV, will be activated. Power for the system of FIG. 4 is supplied by a source of alternating current 43 which is applied to the control circuit via a transformer 45. When the conveyor 36 shown in FIG. 3 has travelled a predetermined distance, a cam 40 on the timing chain 38 will close switch 42 momentarily. This results in the temporary electrical connection of contacts 44 and 46 and allows current to briefly flow down the line 48, through the switch 42 and the contact 46, through the diode 50, and finally through the coils of the relay SD which is of the type which delays in opening but not in closing. The diode 50 and the capacitor 52 produce a direct current pulse of voltage across the coils of the safe dump relay SD which is sufficient to activate the relay, thereby changing the positions of all the switches associated with relay SD namely switches 54, 56 and 68. The switch 54 is thereby closed in preparation for the dump of the weigh pans at a later time, and switch 56 is moved from contact 58 to contact 60 with the result that current flows through line 62, switch 56 and contact 60 and line 62 to switch 64. Since switch 64 is closed due to the deactivated condition of relay DIL, the current passes on through switch 64 and diode 50 and finally through the coils of relay SD completing a latching second current path through relay SD, which is interrupted only by the opening of switch 64. This alternate current path removes the necessity to brake the conveyor abruptly to ensure that switch 42 will remain closed to keep the relay SD activated. With this arrangement, it is only necessary to close the switch 42 momentarily, and the conveyor may then coast to a halt, opening switch 42, without deactivating relay SD.

The movement of switch 56 from contact 58 to contact 60 breaks the current path through the conveyor relay CV which had caused the relay CV to maintain a switch (not shown) closed, thereby providing power to drive the conveyor system (shown in FIG. 3). This current path through relay CV leads from line 48 through line 62, switch 56, contact 58, limit switch LS1, contact 70 and switch 72, and finally through the coils of relay CV. The normally closed limit switch LS1 is opened only by equipment external to the weighing system when the supply of fibers exceeds the capability of the external equipment to deal with the fibers. The opening of the switch LS1 halts the conveyor just after all the weigh pans have dumped and allows the weigh pans to weigh another amount in each pan but not to dump these amounts. The switch 72 remains touching contact 70 so long as the relay TD remains inactivated.

The relays WS1, WS2 and WS3 can be activated only when the respective transistor circuits TR1, TR2 and TR3 becomes conductive allowing current to flow through the coils of WS1, WS2 and WS3. Wires are shown entering transistor switching circuits TR1, TR2 and TR3 from Amplifier 1, Amplifier 2 and Amplifier 3. Each of these amplifiers produces an amplified signal originating from a bridge such as shown in FIG. 2 or from some other apparatus producing an electrical signal indicative of weight. These transistor circuits TR1, TR2 and TR3 then become conductive only when the respective bridge circuit indicates that the correct weight of material, which would not necessarily be the same in each pan, has been fed into the weigh pans. Thus, relay WS1 is activated only when the weigh pan associated with Amplifier 1 has accumulated the correct weight of material. Similarly, WS1, WS2 and WS3 are activated only when their respective weigh pans have weighed out the correct amount.

The closing of all of switches 74, 76 and 78 respectively by relays WS1, WS2 and WS3 activates the relay DIL by completing a current path through the coils of the relay DIL. The activation of relay DIL shifts all the switches under its control from the illustrated positions resulting immediately in the opening of switch 64, interrupting the current path by which the relay SD has been kept activated. The relay SD, which tarries in opening, then remains activated for a few seconds, and then returns all the switches under its control to the illustrated positions. Meanwhile, the closing of switch 80 by the DIL relay while the switch 68 too remains closed, results in the time delay relay TD becoming activated. As in the case of the relay SD, the relay TD has a diode 82 and capacitor 84 to rectify the voltage so that a pulse is passed through the coils of relay TD.

The switch 86 is closed by the activation of the relay TD, completing a current path through relay TD by any of the closed switches 88, 90 or 92, which have been closed respectively by the activation of relays WS1, WS2 and WS3, and thereby providing exciting current for the coils of relay TD even after the opening of switch 68 or 80. The activation of relay TD also pulls the switch 72 from contact 70 to contact 94 thereby constructing a current path through line 62, switch 56, contact 60 and contact 94 and switch 72 to the coils of relay CV, resulting in a prompt renewal of the motion of conveyor 36. This same path, continued through switch 54 to contact 56, also operates dump valve controlling coils DV1, DV2 and DV3. These coils, when energized, each operate a valve, such as a pneumatic valve, which dumps the material in each of the three weigh pans onto the moving conveyor. The operation and function of such valves are fully described in the Lytton et al. patent mentioned above and need not be specifically described herein, but each of the valves opens a trapdoor in the bottom of each weighing pan allowing the weighed material to fall by gravity onto the conveyor.

The deactivation of the relay SD, which occurs a few seconds before the inactivation of the relay TD, then opens the switch 54 interrupting the current path through the coils of DV1, DV2 and DV3 and thereby closing the trapdoors in the bottom of the pans. After the pans have been emptied, the bridge circuits will again indicate the absence of material in the pans, and responding to the output voltage from Amplifier 1, Amplifier 2 and Amplifier 3, transistor switching circuits TR1, TR2 and TR3 return to nonconduction. This in turn inactivates relays WS1, WS2 and WS3, by preventing the flow of current through the coils of WS1, WS2 and WS3, returning all the switches controlled by these relays to the illustrated positions.

The interruption of the current path through the coils of relay DIL, by the opening of any of the switches 74, 76 or 78, inactivates relay DIL, immediately opening switch 80 and closing switch 64. Further, the opening of all of the switches 88, 90 and 92 ends the current path through the coils of the relay TD with the result that the relay TD will return to its inactivated state after a few seconds. However, as long as time delay relay TD remains activated the switch 94 remains open, and none of the feeding motors can operate to feed material into any of the pans. These few seconds, between the inactivation of relays WS1, WS2 and WS3, and the inactivation of relay TD allow the trapdoors to be fully closed and the weigh pans to complete any bouncing which accompanies that closing. If of course any of the trapdoors do for some reason not close, the system cannot continue to operate until the malfunction is corrected. Finally, the relay TD becomes inactivated, closing the switch 94 and thereby allowing the feeder to begin loading more material into the weigh pans. Also the return of switch 72 to contact 70 reactivates relay CV thereby starting the conveyor 36 and completing the cycle of operation.

While the material is being fed into the weigh pans, the SCR circuits SCR1, SCR2 and SCR3 act as variable resistances and operate to control the excitation and hence the speed of motors M1, M2 and M3 respectively, thereby controlling the rate at which material is fed into the pans. Motors M1, M2 and M3 are excited by current paths which lead through weigh pan switches 89, 91 and 93 respectively so that the motors are deactivated whenever these switches or switch 94 is opened. When the pans are empty, it is desirable that the material be fed as quickly as possible. However, as the weight of the material in the pan approaches the weight chosen, the rate of feeding decreases so that the weighing and cutting off of the feeding means can be as precise as possible. This function is accomplished by the SCR circuits SCR1, SCR2 and SCR3 which have a resistance which increases with the weight of material in each respective pan.

The transistor circuits TR1, TR2 and TR3 do not become nonconductive until after the pans have dumped and the output voltage of the amplifier rises above a predetermined level. This prevents the feed motors from operating prematurely due to bouncing of the pans.

Figure 7:
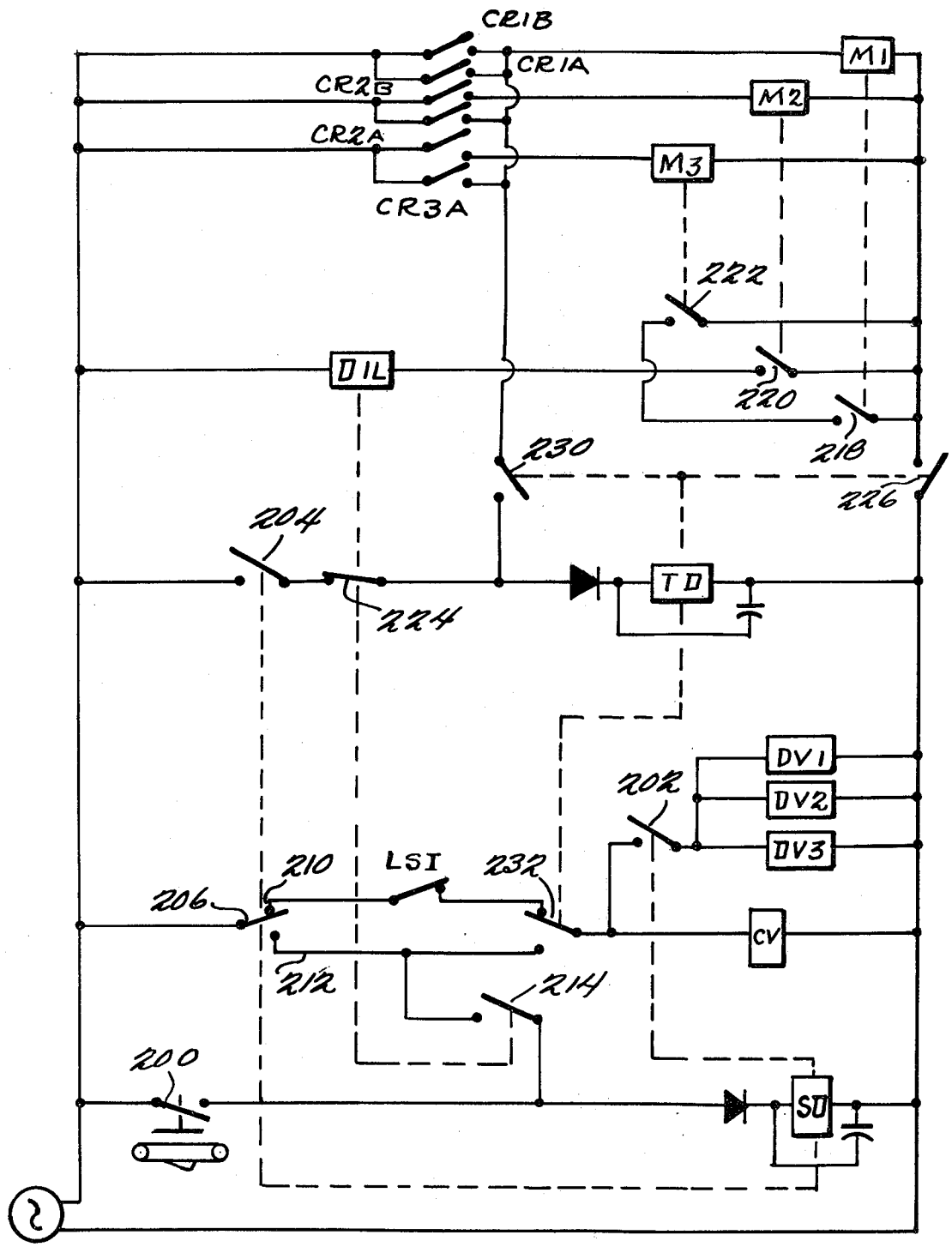
FIG. 7 shows a circuit for controlling the weighing and discharge of fibers in a plurality of weigh pans.

Reference is now made to FIGS. 5, 6 and 7 which disclose another embodiment of the invention for use particularly in weighing materials deposited in a weighing hopper or pan similar to the pan 10 shown in FIG. 1. In this embodiment, as in the embodiment of FIGS. 1-4, it is contemplated that the invention will be of particular use in the field of blending fibers wherein different fibers are deposited in adjacent hoppers and weighed. As discussed above, when each hopper contains the proper weight of material desired for a given blending ratio, then the hoppers are simultaneously discharged onto a moving conveyor or belt which then carries the blend to additional machinery. Circuitry such as shown in FIGS. 4 and 7 controls the filling and discharge of the hoppers and insures that the proper blending ratio is maintained.

In contrast to the embodiment of FIGS. 1-4 in which weight is sensed by wires supporting the weigh pan and having an electrical resistance which varies with the weight of the material to produce a continuous indication of the weight of material in each of the pans associated with the blending line, in the arrangement shown in FIG. 5 the weight of material in a weighing pan is continually measured by detecting the position of an arm connected to the weighing pan which moves in response to an increase or decrease of weight in the pan. In particular, as shown in FIG. 5 an arm 100 which is attached to the weighing pan (not shown) in any suitable manner serves as a lever and pivots about some point, such as its attachment 102 to the weighing pan, so that the member 104 which is firmly attached to the end of arm 102 moves substantially vertically as the weight of material in the pan increases and decreases. Such movements need not be substantial and very small displacements of member 104 can be quite easily and accurately detected as discussed below. Firmly mounted upon the member 104 is a wire 106 formed as a first single turn coil 108 and a second single turn coil 110. A source of alternating current 112, which may be a 60-cycle 1 volt source capable of supplying 10 amps, is connected to the ends of wire 106 as shown so that magnetic flux paths are generated about the single turn coil 108 in one direction and about the single turn coil 110 in the opposite direction.

A detecting probe 114 is associated with and fixedly mounted adjacent to the coils 108 and 110 so that the movement of the member 104 and the attached wire 106 shifts the position of the probe 114 relative to the coils 108 and 110. When the probe 114 is located above the crossover point between the coil 108 and 110 then the flux from coil 108 predominates over the flux from coil 110 and a net voltage of one phase is induced in the probe 114 which is then detected by the null detector 116 which then produces signals to control the speed at which the material is fed into each of the weigh pans as discussed in detail below. When the probe 114 is below the crossover point, the flux from coil 110 predominates and an electrical signal having an opposite phase will be generated in the probe 114 and transferred hence to the null detector 116. Further, the distance of the probe above or below the cross-over point between coils 108 and 110 will be reflected in the amplitude of the voltage induced in the probe 114 so that the amplitude and phase of the induced signal indicates accurately the weight of material in the pan attached to arm 100.

Further, when the probe is located exactly at the crossover point between the coils 108 and 110, the opposing voltages induced by the coils 108 and 110 will exactly cancel and a readily detectable null voltage will result. If the position of the probe 114 is initially adjusted by means of a micrometer or the like to a position such that it will be located at the crossover point at the time that the desired weight of material is in the weigh pan associated with the arm 100, then this null signal can be employed to cut off the flow of material into the weigh pan in the same manner that the balanced bridge output was employed in the arrangement shown in FIG. 2 to shut off the feed motor. Even further, since the amplitude and phase of the voltage induced in the probe 114 will vary as a function of the distance which the member 104 has shifted which in turn is a function of the weight of material in the weigh pan, amplitude and phase information can be employed to control the speed at which material is fed into the weigh pan to permit accurate cut off of that feeding and provide a continuous indication of the weight of material in the pan in the same fashion described above.

It should be apparent that a number of different schemes similar to the arrangement shown in FIG. 5 for detecting movement of the arm 100 and the member 104 can be employed. For example, a small light source could continuously or in pulses impinge light upon photosensitive elements mounted on the arm 104 so that, as the position of the photosensitive elements shifted, so would the voltage output of the elements. The reverse arrangement could be used with a small light source mounted on the arm 104 and one or more photosensitive elements mounted fixedly adjacent to that light source so that the illumination of the elements and hence their output varies as the arm is shifted up and down in response to weight changes. Alternately, the capacitance of some member mounted on the arm 100 in relation to some stationary electrode could be simply and easily mounted to provide an indication of movement. It should be apparent that these are only exemplary of the many possible techniques and apparatus for providing continuous weighing and producing signals to control fiber blending or other equipment.

Assuming that the weigh pan associated with arm 100 has just dumped and accordingly is empty, probe 114 will detect a voltage indicating an empty condition and the null detector 116 will pass a suitable analog or digital signal to the speed control circuitry 118 which accomplishes basically the same functions as the bridge and amplifier circuitry shown in FIG. 2. This control circuitry is substantially conventional and a Dodge SCR Adjustable Speed Drive, Model 300, made by the Dodge Company of Mishawaka, Indiana has been successfully employed. Control circuitry 118 then employs the signal passed from the null detector 116 to produce suitable output signals on lines 120 and 122 which, as shown, are connected to the armature 141 of motor 140. Motor 140 feeds the fibers into the weigh pan associated with arm 100 and is preferably a small DC motor with a speed which varies as the voltage applied to the armature 141 by speed control 118. The field windings 139 of motor 140 are conventionally connected to a voltage source 150 via conventional full wave rectifier 152. A horsepower 90 volt armature, 100 volt field, DC motor has been successfully employed.

Thus when the weigh pan is empty, the probe 114 will produce a signal which is passed to the null detector 116 indicating an empty condition and the null detector will then pass a signal to the speed control circuitry 118 which responds by applying a voltage to armature 141, 136 which permits the maximum current to flow through the armature 141. The motor 140 then responds by operating at the maximum speed at which it operates during the cycle and thus feeds material into the weigh pan associated with arm 100 at the maximum rate. As the material begins to accumulate in the weigh pan 100, the signals produced by the probe 114 reflect the increased weight detected and the speed control mechanism 118 alters the signals applied to armature 141 via speed control 118 so that the current flowing to the motor is continually reduced and the rate at which material is added to the weigh pan decreases. One or more SCR's can be provided within control 118 to accomplish this function.

The graph of FIG. 6 shows the response of a system set for weighing 18 ounces of material such as fibers in a given weigh pan. In this arrangement the motor is adjusted to run at a top speed of 850 RPM as shown. For the plot labelled 170, the speed control circuit 118 is adjusted to permit the motor to run at top speed until the signals received from probe 114 indicate that 16 ounces, or 2 ounces short of the desired amount, are lodged within the pan associated with arm 100. At this time, the gate voltages of the SCR's are changed so the resistance of each SCR is increased and current through motor 140 decreases so that the motor speed rapidly falls, as does the feed rate, toward 100 RPM which is the motor speed when the desired 18 ounces of material has been accumulated.

As discussed in detail below, at this time, relay CR1 is actuated in preparation for a dump after all of the weigh pans which are weighing material to be blended have accumulated the correct amount of material. Further, the speed control arrangement is adjusted so that when the motor reaches a given speed such as 100 RPM in the arrangement shown in the graph of FIG. 6 or when it reaches a given weight such as 18 ounces in that graph, the motor 140 will be completely cut off by signals applied to the gates of SCR's in speed control 118.

Plot 172 of FIG. 6 also illustrates another procedure for cutting off the flow of material into the weigh pan in which the motor runs at top speed only until four ounces have accumulated in the weigh pan after which the motor speed is continually reduced at a rate less than the rate of reduction for the line 170 until upon reaching either 100 RPM or 18 ounces the motor 140 is completely cut off, preventing further flow of material into the weigh pan associated with arm 100. Thus, the novel arrangement shown in FIG. 5 permits materials to be fed into the weigh pan at a rapid rate initially while also permitting the material to be fed very slowly as the correct weight of material is approached to permit accurate cut off and weighing.

Reference is now made to FIG. 7 which shows a control circuit similar to the control circuit of FIG. 4 and which is designed especially for use with the weighing system of FIG. 5. In this arrangement, which is designed to serve three weighing pans, each controlled by a weighing arrangement such as shown in FIG. 5, the weighing relays WS1, WS2 and WS3, as shown in FIG. 4, have been replaced by the relays CR1, CR2, and CR3 of FIG. 5 which are each controlled by a null detector 116 and activated preferably when that null detector 116 detects a null as discussed above. While only relay CR1 is illustrated in FIG. 5 it will, of course, be understood that relays CR2 and CR3 are correspondingly connected to similar null detectors. While several other minor changes have been made, the operation of the circuitry is basically the same as in FIG. 5.

After a dump, relays SD and TD of FIG. 7 will be deactivated while relays M1, M2, M3, DIL and CV will be activated. In the same manner as described above, activated relay CV then causes the conveyor to move forward until switch 200 is momentarily closed, thereby completing a path through relay SD which responds by closing switches 202 and 204 in preparation for a dump and shifting switch 206 from contact with line 210 to contact with line 212. Since switch 214 is now closed by activated relay DIL, switch 206 now completes a latching path through relay SD so relay SD remains activated even should the conveyor coast and reopen switch 200.

Meanwhile, material is being fed into each of the weigh pans in the system and is being continuously weighed by the arrangement shown in FIG. 5. When the pan associated with relay CR1 in FIG. 5 weighs the desired amount, normally closed switch CR1B, shown in FIG. 7, is opened, thereby deactivating relay M1 which then permits switch 218 to open. Likewise, when the pans associated with relays CR2 and CR3 have the desired weight of material, switches CR2B and CR3B are opened, deactivating relays M2 and M3 and opening switches 220 and 222.

The relay DIL is deactivated when switches 218, 220 and 222 are all open indicating that all pans are ready for dumping. The deactivation of relay DIL returns switch 224 to its illustrated normally closed position, thus completing a path through relay TD. The flow of current through relay TD then causes switch 226 to be opened thus preventing relays M1, M2, M3 and DIL from being reactivated as long as relay TD remains activated and also causes switch 230 to be closed and switch 232 to be shifted into contact with line 212. Switch 230 completes another path through relay TD via now closed switches CR1A, CR2A or CR3A, while switch 232 completes a current path through relays DV1, DV2 and DV3 which then operate in the manner described above to cause all the pans to dump their weighed contents onto the conveyor.

The opening of switch 216 by the deactivation of relay DIL cuts off the flow of current through relay SD which, however, delays a few seconds in returning the switches controlled by it to their illustrated positions. However, after a short time, switch 202 opens deactivating relays DV1, DV2 and DV3 and ending the dump.

Likewise, the opening of switch 204 by deactivated relay SD cuts off current flow through relay TD since switches CR1A, CR2A and CR3A are also now open as a result of the emptying of all of the weigh pans. Relay TD also delays a short time before returning its switches to their illustrated positions, but after a few seconds switch 226 closes so that relays M1, M2 and M3 are again activated, switch 250 opens and switch 206 returns to its illustrated position completing a path through relay CV and thus completing the cycle.

This embodiment illustrates another arrangement for providing a continuous indication of the weight in each of the weigh pans in a fiber blending system. Many other techniques and variations are discussed briefly above and many further arrangements could be used to accomplish these goals.

What is claimed is:
1. Weighing apparatus comprising:
 a weighing pan,
 four groups of loops of wire, each of said loops having an electrical resistance which is proportional to the force stretching said loops,
 a first loop of each of said groups being situated so that an increase in the weight in said pan increases the force stretching said first loop, and a second loop of each of said groups being situated so that an increase in the weight in said pan decreases the force stretching said second loop,
 an electrical bridge comprising a plurality of elements one of said elements being all of said first loops of all of said groups connected serially and a second of said elements being all of said second loops of all of said groups connected serially,
 means to apply an electrical potential across at least one of said groups, and
 means to determine the changes of resistance of at least one loop from said four groups of loops, said changes being proportional to changes in weight in said pan.
2. Weight apparatus as in claim 1 wherein each of said four groups of loops are located approximately above a different cover of said pan and said first loops support said pan.
3. A weighing system comprising:
 a plurality of weighing pans, means to feed material to be weighed into each of said weighing pans, a plurality of wires, at least one wire supporting each said weighing pan, said wires having an electrical resistance which is proportional to the weight each supports, a plurality of bridges with a plurality of elements, at least one of said elements in each bridge being one of said wires, and means to determine the resistances of each of said wires.

4. In a blending machine with a plurality of weighing pans, a plurality of feeders loading different materials into said pan, means to weigh said pans, means to cut off the loading of said pans when said pans contain the desired weight of material, and means to empty said pans, the improvement in said weighing means of at least one piece of wire supporting each of said pans, said wire having an electrical resistance which varies with the weight said wire supports.

5. The improvement of claim 4 including electrical bridges associated with each said pan with at least four elements, at least one of said elements being said wire.

6. The improvement of claim 4 wherein said wire is a Nickel-chromium-Iron alloy.

7. The improvement of claim 5 including means to apply an electrical potential to at least one of said elements of each of said bridges to produce an output signal at each bridge which is a continuous function of the weight in the pan associated with that bridge.

8. The improvement of 7 wherein said means to cut off the loading of said pans is controlled by said output signals.

9. A system as in claim 3 wherein each of said wires is an alloy of nickel, chromium and iron.

10. A system as in claim 3 wherein each said support wire has first and second sections with the resistance of each first section increasing with increases in weight of material in the respective pan and the resistance of the corresponding second section of each support wire decreases with increases in the weight of material in the respective pan.

11. A weighing system as in claim 3 wherein for each of said weighing pans the support wires includes four groups of loops of wire, each of said loops having an electrical resistance which is proportional to the force stretching said loops, a first loop of each of said groups being situated so that an increase in the weight in the respective pan increases the force stretching said first loop, and a second loop of each of said groups being situated so that an increase in the weight in the corresponding respective pan decreases the force stretching said second loop, each of said electrical bridges comprising as one of said elements all of said first loops of the respective four groups connected serially and a second of said elements being all of said second loops of the corresponding four groups connected serially, means to apply an electrical potential across at least one of said groups in each bridge, and means to determine the changes of resistance of at least one loop from said four groups of loops in each bridge, said changes being proportional to changes in weight in the respective said pan.

12. A weighing system as in claim 3 including means for selecting the weight of material to be fed into each of said pans.

13. A weighing system as in claim 11 wherein each of said four groups of loops for each pan is located approximately above a different corner of the respective pan and said first loops of each respective group support their respective pan.

14. A weighing system comprising a plurality of weighing pans each having:

two pieces of wire which have an electrical resistance which is proportional to the force stretching said pieces, at least one insulated block attached to the respective weighing pan, a first and second stationary support piece of said wire having both ends attached respectively to said first stationary support and attached in approximately the middle of said block and a second piece of said wire attached in approximately the middle of said block and attached at both ends to said second stationary support, said wires being situated so that an increase in the force stretching said first piece causes a decrease in the force stretching said second piece, means for feeding material for weighing into said pans, increasing the force stretching said first piece and decreasing the force stretching said second piece, an electrical bridge comprising a plurality of elements, two of said elements being said two pieces of wire, means to apply an electrical potential across at least one of said elements, and means to determine the changes of resistances of at least one of said two pieces of wire, said changes being proportional to changes of weight in said pan.

15. A weighing system as in claim 14 including means for selecting the weight of material to be fed into each of said pans.

16. Weighing apparatus as in claim 14 wherein the length of said pieces of wire is adjustable.

17. A weighing system as in claim 15 wherein said selecting means includes a removable weight coded insert for each of said bridges.

18. A weighing system as in claim 15 wherein said selecting means includes an adjustable resistance element in said bridge.

19. A weighing system comprising:

a plurality of weigh pans, means for feeding material to be weighed into each of said weighing pans, four insulated blocks associated with each said pan, four wires, associated with each said pan, each connecting a different corner of said pan to one of said blocks so that said pan is supported by said blocks, a first and second stationary support, four groups of loops of wire associated with said pan between said supports and blocks, each of said loops having an electrical resistance proportional to the force stretching said loops, and a plurality of bridges respectively for said pans and containing the respective four groups of loops to measure said resistance and provide a weight indicating output signal.

20. A weighing system as in claim 19 including recording means associated with each said bridge to receive said output signal thereof and record the measured weight.

21. A weighing system comprising:

a plurality of weigh pans, means for feeding material to be weighed into each of said weighing pans, four insulated blocks associated with each said pan, four wires, associated with each said pan, each connecting a different corner of said pan to one of said blocks so that said pan is supported by said blocks, a first and second stationary support, four groups of loops of wire associated with said pan between said supports and blocks, each of said loops having an electrical resistance proportional to the force stretching said loops, a first loop of each of said groups having both ends attached to said first stationary support and disposed about one of said blocks in approximately the middle of said first loop of wire so that each said first loop of wire supports one of said blocks and so that an increase in the weight in said pan, increases the force stretching said first loop of wire, a second loop of each of said groups having both ends attached to said second stationary support and disposed about one of said blocks in approximately the middle and insulated from all of said first loops so that an increase in the weight in said pan decreases the force stretching said second loop of wire, an electrical bridge associated with each said pan comprising four resistive elements, one of said elements being all of said first loops of said groups associated with that pan connected in series and a second of said elements being all of said second loops of said groups connected in series, means associated with each said bridge to apply an electrical potential to said bridge, means associated with each said bridge to amplify the output of said bridge, and means associated with each said bridge to vary the resistance of a third of said elements to change the weight of material in said pan necessary to balance said bridge.

22. A method for blending a plurality of materials comprising the steps of:

selecting the weight of material to be fed into each weigh pan, feeding said materials into a plurality of weigh pans, each of said pans being supported by at least one piece of wire, the electrical resistance of said wire being proportional to the weight of said material in each said weighing pan each said wire supports, applying electrical potentials to a plurality of bridges, each said bridge comprising a plurality of resistance elements, at least one of said elements being each said wire supporting each said pan, determining said electrical resistances of said wires from the voltages across at least one of said elements, stopping each said feeding into each said weigh pan when said selected weight of each said material is in each said weigh pan, and dumping said materials in said pans onto a moving conveyor belt.

* * * * *